(12) United States Patent
Dempsey

(10) Patent No.: US 6,981,674 B1
(45) Date of Patent: Jan. 3, 2006

(54) SYSTEM AND METHOD FOR SPACE ELEVATOR

(76) Inventor: James G. Dempsey, 85 Cove La., Oshkosh, WI (US) 54902

( * ) Notice: Subject to any disclaimer, the term of this patent is extended or adjusted under 35 U.S.C. 154(b) by 0 days.

(21) Appl. No.: 10/942,007

(22) Filed: Sep. 16, 2004

(51) Int. Cl.
*B64G 9/00* (2006.01)

(52) U.S. Cl. .................................. 244/158.2

(58) Field of Classification Search ............ 244/158 R, 244/159
See application file for complete search history.

(56) References Cited

U.S. PATENT DOCUMENTS

| | | | | |
|---|---|---|---|---|
| 3,295,489 | A | * | 1/1967 | Bossa .......................... 114/294 |
| 5,515,804 | A | * | 5/1996 | Pollack .................. 114/230.12 |
| 6,483,208 | B2 | | 11/2002 | Hooley |
| 6,682,677 | B2 | | 1/2004 | Lobovsky et al. |
| 6,764,628 | B2 | | 7/2004 | Lobovsky et al. |

OTHER PUBLICATIONS

Brad Lemley, Going Up, Discover, Jul. 2004, p. 32, vol. 25, No. 7, Buena Vista Magazines, Boone, IA.
Carl Hoffman, Conspicuous Consumption— Space Elevator, Popular Science, Apr. 2004, p. 54, vol. 264 #4, Popular Science Properties, Tampa, FL.
Peter N. Spotts, Going up? Space elevator could slash launch costs, The Christian Science Monitor, p. 14/s01, Oct. 2, 2003, T.C.S.M., Boston, MA.

* cited by examiner

*Primary Examiner*—Galen L. Barefoot (57) ABSTRACT

A system and method for a Space Elevator using a transport tether shaped into double catenary with one catenary below synchronous orbit altitude and the second catenary above synchronous orbit altitude and while also forming a harmonic oscillator using a combination of gravitational and centripetal forces with the zero crossing of the harmonic oscillator at an altitude of approximately one half synchronous orbit altitude of attached elevator.

8 Claims, 6 Drawing Sheets

SYSTEM AND METHOD FOR SPACE
ELEVATOR

CROSS REFERENCE TO RELATED
APPLICATIONS

Referenced-applications
U.S. Pat. No. 6,483,208 Nov. 19, 2002 Hooley
U.S. Pat. No. 6,682,677 Jan. 27, 2004 Lobovsky, et al.
U.S. Pat. No. 6,764,628 Jul. 20, 2004 Lobovsky, et al.

BACKGROUND OF INVENTION

Research on a Space Elevator is being performed at the time of this Patent application. Public disclosures of promising technologies have been presented in recent periodicals. This reference material can be found in the following periodicals:

DISCOVER, Vol. 25 No. 07 | July 2004 | Astronomy & Physics
Popular Science, April 2004
The Christian Science Monitor, Oct. 2, 2003

The leading research institute performing research into the Space Elevator is the Institute for Scientific Research, Inc. (ISR), Farimont, W. Va. A brief description of a Space Elevator as provided by ISR follows:

"The Space Elevator is a revolutionary way of getting from Earth into space—a ribbon with one end, attached to Earth on a floating platform located in the equatorial Pacific Ocean and the other end in space beyond geosynchronous orbit. The Space Elevator will ferry satellites, spaceships, and pieces of space stations into space using electric lifts clamped to the ribbon, serving as a means for commerce, scientific advancement, and space exploration."

The Space Elevator, as envisioned by ISR, uses an elevator capable of climbing a tether (ribbon cable) of an anchor weight where the Earth attachment point is near the equator and the anchor weight is located at the other end of the tether at an altitude of approximately 1 00,000 kilometers. At such altitude the centripetal force on the tether and anchor weight exceeds that of the gravitational force on the tether and anchor weight thus causing the tethered anchor weight to remain in a fixed synchronous orbit. Recent advances in material technology, in particular carbon nano tube (CNT) development, makes it possible to construct a tether of such magnitude and strength. See U.S. Pat. No. 6,682,677 Jan. 27, 2004 Lobovsky, et al., "Spinning, processing, and applications of carbon nanotube filaments, ribbons, and yarns", and U.S. Pat. No. 6,764,628 Jul. 20, 2004 Lobovsky, et al., "Composite material comprising oriented carbon nanotubes in a carbon matrix and process for preparing same", which are hereby incorporated by reference.

The elevator, as envisioned by ISR, contains a locomotion device consisting of a traction device known as a gripper, and an electric motor and drive system. The electricity for the motor is beamed to the elevator from a power broadcasting station located at or near the Earth based attachment point. The elevator is designed to climb up and climb down the tether.

The ISR proposed system has the attractive feature of requiring only the single tether for support but has a disadvantage in that the elevator must contain the locomotion device as well as power conversion device that receives and converts the beamed power from the Earth station. Additionally the ISR configuration lacks a counterbalance system thus requiring the locomotion device to lift the dead weight of the elevator, locomotion device and payload. The ISR design requires a substantial Earth-based power generation system and power broadcast system.

SUMMARY OF INVENTION

A Space Elevator system consisting of a single or segmented transport tether who's ends are anchored at two anchor points and either one support tether or in an alternate configuration two support tethers. One anchor point being on one support tether at an altitude of slightly higher than the altitude of the attached elevator car at it's midpoint between the elevator car's lowest and highest service altitudes and the second anchor point at a sufficient level, as described shortly, as to meet the requirements of this invention. The length of the transport tether is such that transport tether can be routed from the lower anchor point to the rotating non-luminous celestial body (planet or moon, e.g. Earth, Mars, Titan) then routed upwards significantly past synchronous orbit altitude then down to a second anchor point. When both ends of the transport tether are attached to a single support tether the shape of the transport tether resembles an elongated C shape. When one end of the transport tether is attached to a support tether and the other end of the transport tether is attached to either the non-luminous celestial body or to a second support tether the shape of the transport tether resembles an elongated sideways S shape. In both shapes, C and S, and without the influence of additional components there will appear at a lower altitude portion of the transport tether a shape that approximates that of a catenary who's shape is dictated predominantly by gravitational force and the higher altitude portion of the transport tether resembles a shape of an inverted catenary who's shape is dictated predominantly by centripetal force. In both configurations the transport tether can be described as having three sections: a) The section between the highest altitude catenary (apogee) and the attachment point in the direction along the transport tether away from the lower catenary, b) The section between the lower catenary (perigee) and the attachment point in the direction along the transport tether away from the upper catenary, and c) the remainder of the transport tether between the apogee and perigee of the two catenaries. These three sections of the transport tether fall into two categories. The anchored portions (those with anchor points) and the movable portion (the segment of the transport tether between the catenaries without the anchor points). The transport tether is sufficiently flexible such that the gravitational and centripetal forces acting on the anchored portions of the transport tether exert comparatively little influence on the movable portion of the transport tether as it would if the transport tether were ridged. When the movable portion of the transport tether moves upwards (away from axis of rotation of the body) some of the movable portion of the transport tether rolls over the top (apogee) of the top catenary and thereby that portion of the transport tether becomes part of the top anchored portion of the transport tether. Likewise, at the bottom catenary some of the bottom anchored portion transport tether rolls past the bottom most point (perigee) of the bottom catenary to become part of the movable portion of the transport tether. When the movable portion of the transport tether moves downwards the inverse action occurs. As the movable portion moves either upwards or downwards portions of the transport tether transfer to or from the movable portion to the anchored portion of the transport tether. Upon this transfer the movable portion experiences changes in and changes in the distribution along, the movable portion of the transport tether of mass, weight, and momentum. This invention exploits these changes in and changes in the distribution along the movable portion of the transport tether of mass, weight and momentum.

The tethers being fabricated from multiple layers of strength contributing members, such as ribbons containing carbon nanotubes, and multiple layers of mass contributing members, such as ribbons containing steel foil, steel wire or steel coated carbon nanotubes and optionally multiple layers of non-magnetic conducting layers such as aluminum foil. The fabrication of the tether is such that it is not uniform in strength or mass per unit length across the length of the tether. This invention exploits a non-uniform distribution of mass and strength along the transport tether.

The length of the transport tether is such that it can be lowered to the point where the bottom catenary reaches a service station in proximity of the body (e.g. Earth, Mars, Titan). The point on the transport tether that reaches a service station in proximity of the body defines the attachment point of the elevator car where said car is attached. The location of the elevator car when at the lowest elevation is defined as at Base Station. When at Base Station the upper catenary extends sufficiently past the synchronous orbit altitude such that the movable portion of the transport tether maintains positive buoyancy.

When the movable portion of the transport tether is moved upwards it takes the attached elevator car and payload with it. The length of the tether between the elevator and the attachment point on the primary support tether plus the altitude of the attachment point on the primary support tether defines the highest service station altitude of the elevator. And when the elevator car is at synchronous orbit altitude the system is defined as being at Synchronous Orbit Station.

The strength members of the tether and the mass members of the tether are built up in layers such as by the bonding of multiple ribbon layers with the use of an epoxy or other suitable binding agent. And the mass is distributed along the transport tether such that when the elevator car is approximately at one half of synchronous orbit altitude that the assemblage of the movable portion of the transport tether, elevator and payload reach neutral buoyancy (zero weight). This position is called the Transition Point. At this position the structure is configured such that the sum of the gravitational and centripetal forces exerted on the movable portion of the transport tether, elevator and payload net out to zero.

As the movable portion of the transport tether with attached elevator car and payload is moved downwards where the elevator car is below the Transition Point altitude the mass distribution of the strength and mass contributing members of the movable portion of the transport tether is configured such that the assemblage attains increasingly positive buoyancy (negative weight). Conversely, as the movable portion of the transport tether with attached elevator car and payload is moved upwards where the elevator car is above the Transition Point altitude the mass distribution of the strength and mass contributing members of the movable portion of the transport tether is configured such that the assemblage attains increasingly negative buoyancy (positive weight). In such configuration the elevator car and payload has a tendency to fall upwards from Base Station and fall downwards from Synchronous Orbit Station.

One of the principal claims of this invention is the use of this tendency of the transport tether with attached elevator car and payload to fall towards the Transition Point which is tuned to be approximately half way between Base Station and Synchronous Orbit Station. If the elevator car were to start at rest from either stationing position then the tendency to fall towards Transition Point will first accelerate the movable portion of the tether until the elevator car reaches maximum vertical velocity at the Transition Point and then after passing the Transition Point the direction of acceleration reverses and the acceleration reduces the velocity until the movable portion of the tether with elevator car and payload come to rest at or near the other stationing position. This action can be described as a harmonic motion.

It should be noted that this invention exploits the fact that the mass of the movable portion of the transport tether is the contributing factor for the acceleration of the movable portion of the transport tether and attached elevator and payload. As such, this invention eliminates the requirement of supplying a significant amount of external force in order to get the sizable mass of the movable portion of the transport tether together with the elevator car and payload into motion.

Attached to the support tether(s) and slightly above synchronous orbit altitude and above the maximum altitude for the elevator car is a locomotion device that is capable of guiding the movable portion of the transport tether through the locomotion device while additionally providing a controlled force on the movable portion of the transport tether in either an upwards or downwards direction. In an alternate configuration a locomotion device can be placed at and ride with either of the catenaries or two locomotion devices can be placed, one at each catenary.

The transport tether and attached elevator and payload, as it rises and falls, will experience an additional apparent force in a lateral (East/West) direction due to the requirement of the conservation of angular momentum. This force is called the Coriolis force. The transport tether may operate either with or without Coriolis force compensation devices. The figures provided with this specification do not indicate the placement nor nature of these compensation devices. When operating without compensation devices the transport tether will flex at the the anchor positions as well as at the locomotion device. The degree and direction of flex and location of elevator are calculable and controllable therefor the control system may eliminate the need for compensation devices. It is not known at this time if it will be advantageous to include compensation devices. To compensate for Coriolis force the transport tether may optionally be constricted to move (slide) in close proximity to a guide-way tether. In the case of the single support tether configuration the support tether can act as the guide-way tether or there can be a separate guide-way tether. In the case of the dual support tether configuration either or both support tethers may act at the guide-way tether or there can be a separate guide-way tether.

Distributed along the guide-way tether are optional restriction devices that permit the movable portion of the tether to freely slide by the guide-way tether while restricting the movable portion of the transport tether to close proximity of the guide-way tether and while not restricting the transition of tether to or from the movable portion of transport tether and anchored portions of transport tether. In this configuration the locomotion device is used to help accelerate and alternately brake (slow) the movable portion of the transport tether affecting it's vertical velocity and the restriction devices on the guide-way tether together with the tension on the guide-way and transport tethers can impart a horizontal force on the transport tether to compensate for the required change in angular momentum of the transport tether and elevator car and payload as the transport tether rises or falls.

DETAILED DESCRIPTION

When configured for use on Earth the altitude of the counterweight 8 at the end of the support tether 2 is on the order of 88,000 kilometers whereas the width of the structure (horizontal distance between 5 and 6 in FIG. 1) is on the order of 1 kilometer. Due to the extreme difference in the length to width (88000:1) it is indispensable for the clarity of the views, and for the understanding of this invention, to draw the figures non-proportional. Also the attached components are drawn out of proportion such that they can be seen. It should be noted that when used on some other body than Earth, such as a large asteroid, the proportionality of the figures drawn may approach those required in execution of the invention. Additionally in regards to proportionality, items 10 thru 18 and 20 thru 27 are finely drawn circles indicating the location of the enlargement views, the center of each circle represents the positions of mass contributing members (additional counterweight mass laminated onto the tether) and the area of the circles represents the relative mass of the mass contributing members.

Figure 1:
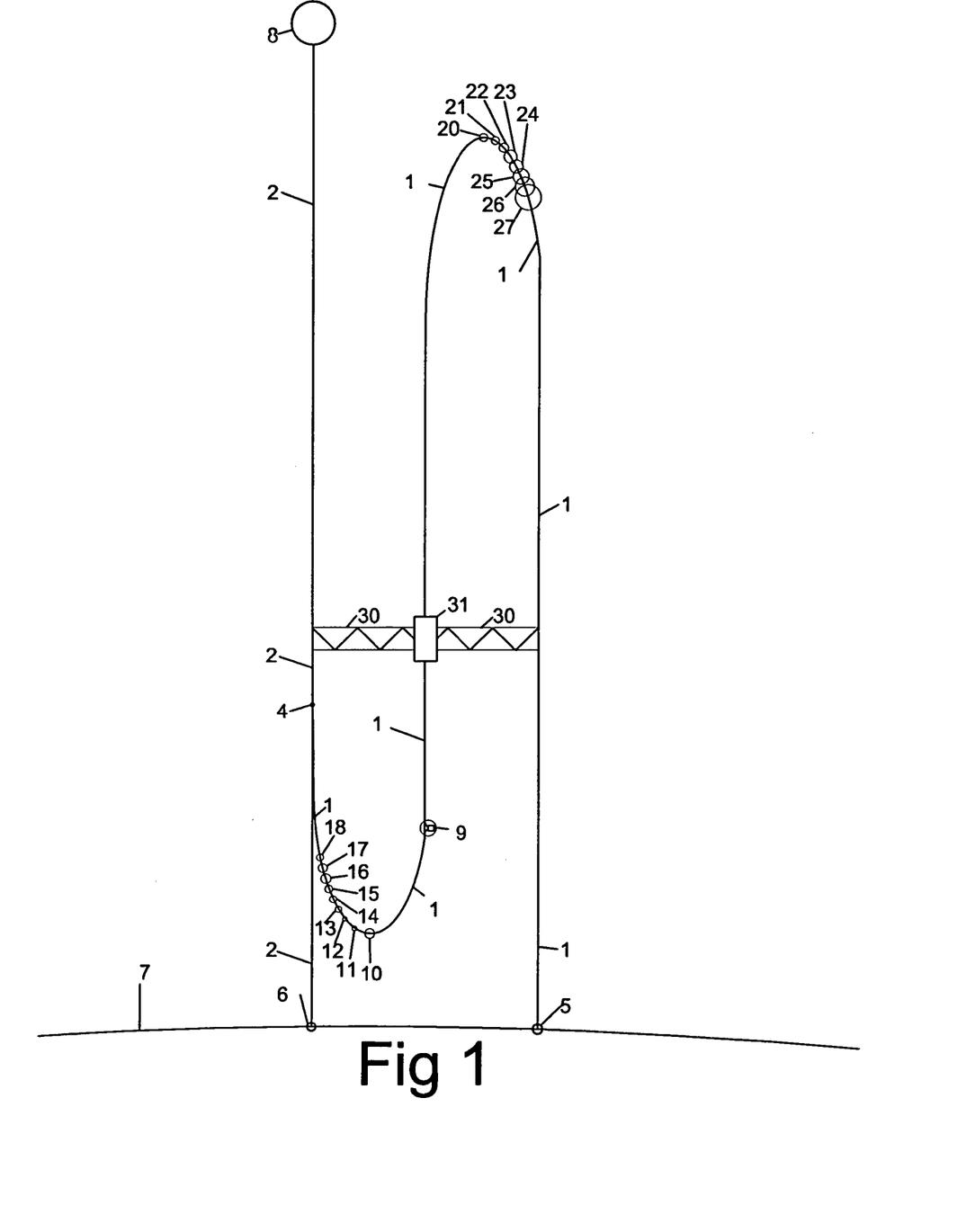
FIG. 1 illustrates the transport tether attached to a single support tether in the S shaped configuration with the transport tether at the Transition Point (neutral buoyancy) altitude.
Figure 2:
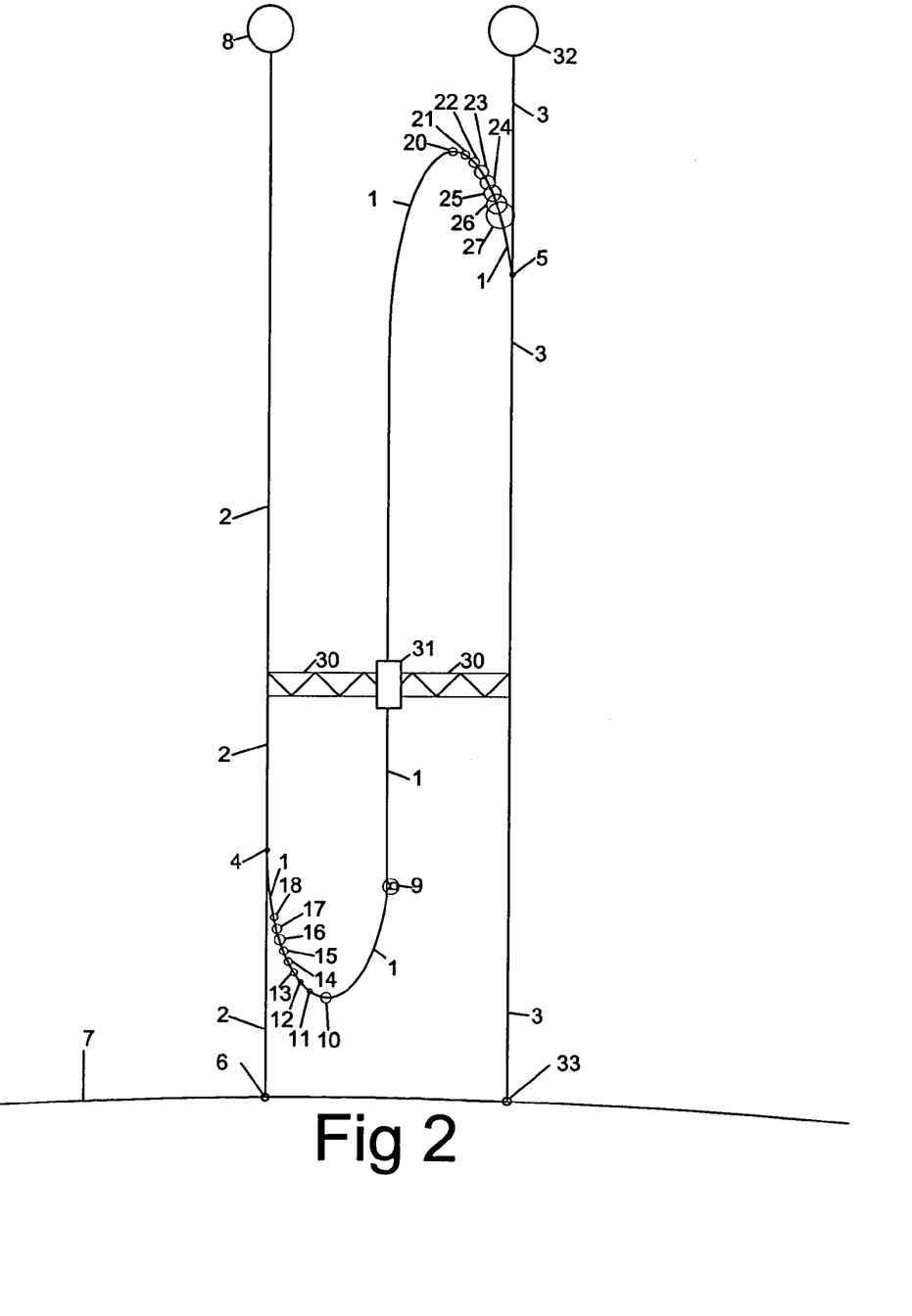
FIG. 2 illustrates the transport tether attached to a dual support tether in the S shaped configuration with the transport tether at the Transition Point (neutral buoyancy) altitude.
Figure 3:
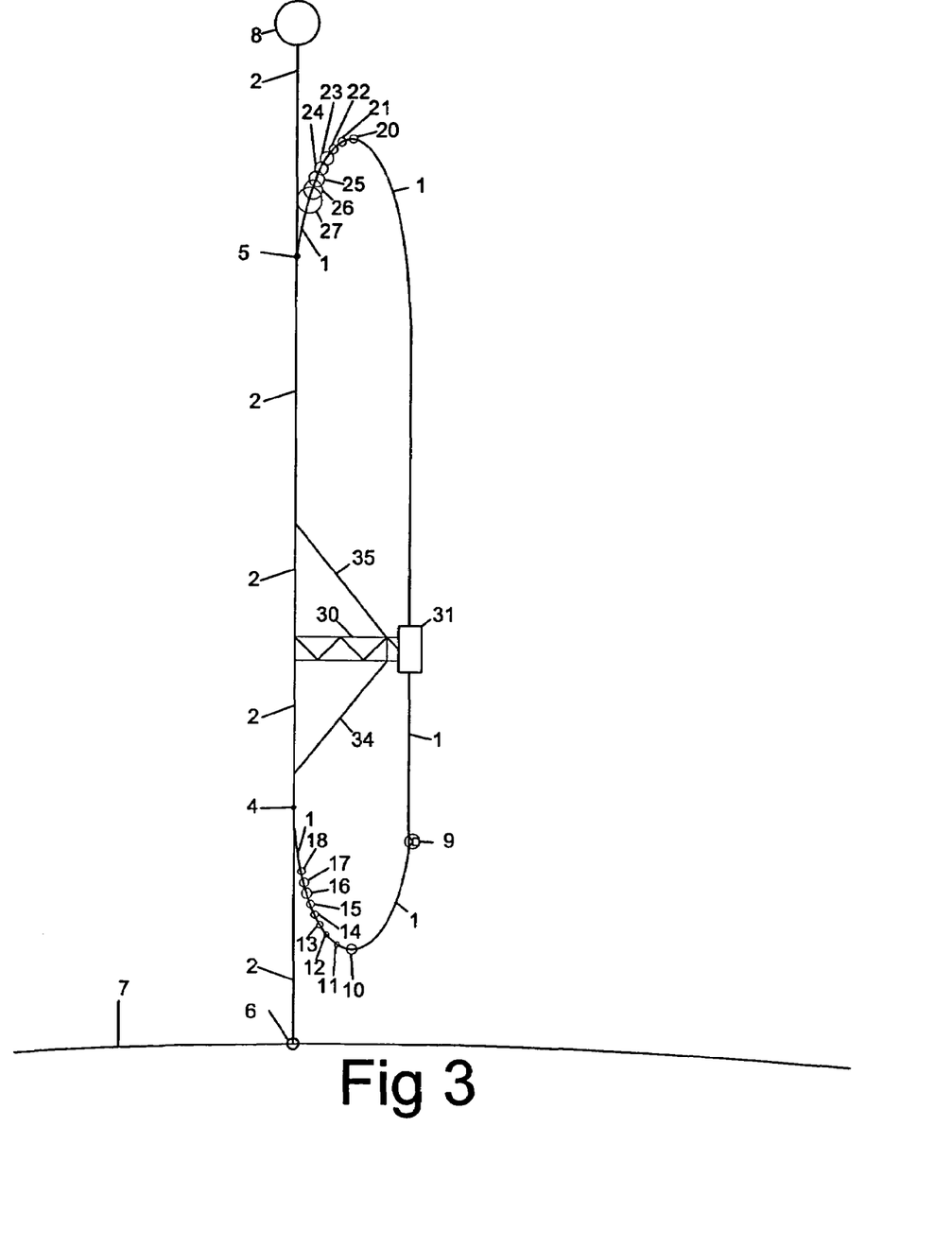
FIG. 3 illustrates the transport tether attached to a single support tether in the C shaped configuration (mirror image of C) with the transport tether at the Transition Point (neutral buoyancy) altitude.
Figure 4:
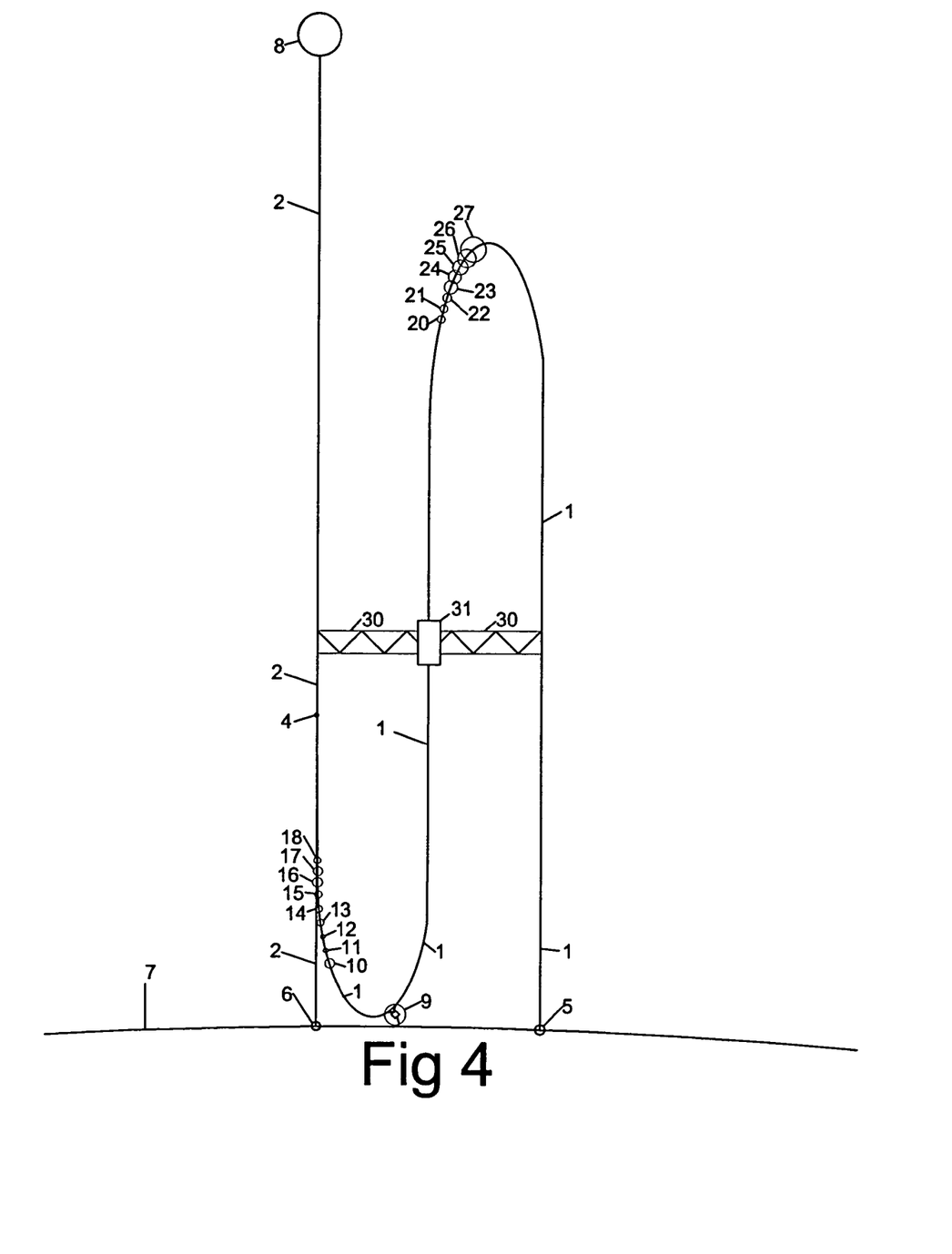
FIG. 4 Is the same configuration as FIG. 1 except that the transport tether is lowered to the point where the elevator is in proximity of the body.
Figure 5:
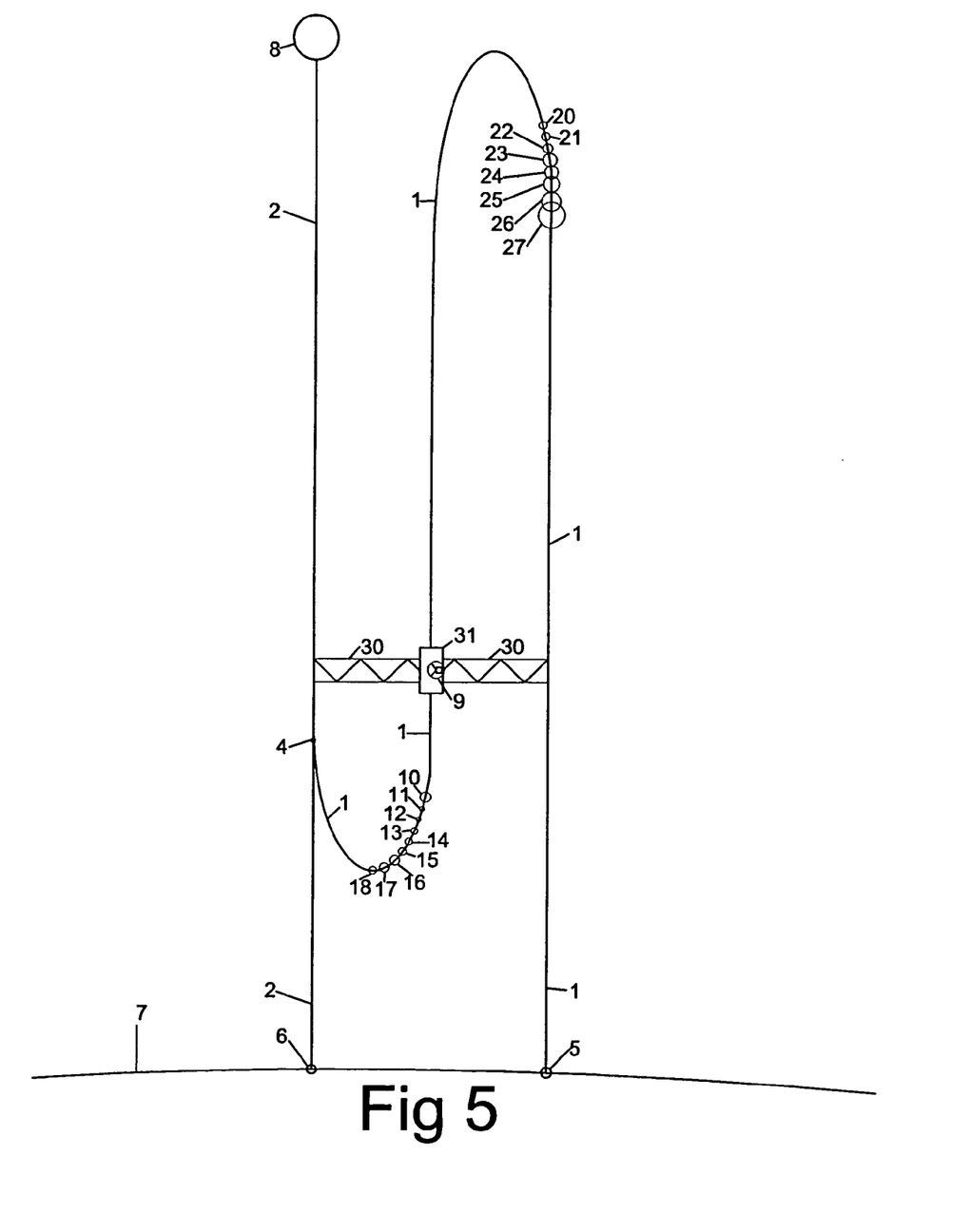
FIG. 5 Is the same configuration as FIG. 1 except that the transport tether is raised to the point where the elevator is in proximity of the locomotion device.

FIG. 1 depicts a preferred embodiment of the invention, FIG. 2 and FIG. 3 depicts alternate embodiments of the invention. FIG. 4 and FIG. 5 depict different positions of the embodiment represented in FIG. 1. The invention consists of a tether, which may be segmented, shown as 1 in FIG. 1, FIG. 2, FIG. 3, FIG. 4 and FIG. 5. The tether is formed into a double catenary shaped structure, hereinafter referenced as the transport tether, where the apex of the lower catenary (perigee) is located at 10 in FIG. 1 and which said lower catenary is below the geosynchronous orbit altitude of the body which said the geosynchronous orbit altitude of the body is the approximate altitude of the truss 30, and the apex of the upper catenary (apogee) is located at 20 in FIG. 1, FIG. 2 and FIG. 3 and above the geosynchronous orbit altitude of the body.

One end of the transport tether 1 is attached to an attachment point 4 on a primary support tether 2 with the purpose of restricting vertical movement of the section of the transport tether between the attachment point 4 and the apex of the lower catenary (perigee). The primary support tether shown as 2 in FIG. 1, FIG. 2, FIG. 3, FIG. 4 and FIG. 5 has one end attached to a support structure 6 located near to the equator on the surface of a rotating non-luminous celestial body (Earth, Mars, Titan, etc . . . ) shown as 7. The second end of the primary support tether 2 is attached to a counterweight 8 located beyond the synchronous orbit altitude of the rotating non-luminous celestial body shown as 7. In the case where the rotating non-luminous celestial body is Earth the length of the primary support tether is approximately 88,000 kilometers. At this length the centripetal force acting on the counterweight 8 and support tether 2 exceed the gravitational force on the counterweight 8 and support tether 2 and thereby forms a self supporting tethered satellite system. The second end of the transport tether 1 is attached to a secondary attachment point shown 5 in FIG. 1, FIG. 2, FIG. 3, FIG. 4 and FIG. 5 and where in FIG. 1, FIG. 4 and FIG. 5 the secondary attachment point 5 is located on the surface of the rotating non-luminous celestial body 7 and where in FIG. 2 the secondary attachment point 5 is located on a secondary support tether 3, and where in FIG. 3 the secondary attachment point 5 is located on the primary support tether 2. The length of the transport tether 1 is dependent on the placement of attachment point 5. The length of the transport tether 2 is chosen as to place the lower and upper catenaries into the positions as depicted in FIG. 1, FIG. 2, FIG. 3, FIG. 4 and FIG. 5. Attachment point 5 restricts the vertical motion of the second end of the transport tether between the attachment point 5 and the apex of the upper catenary (apogee).

Figure 6:
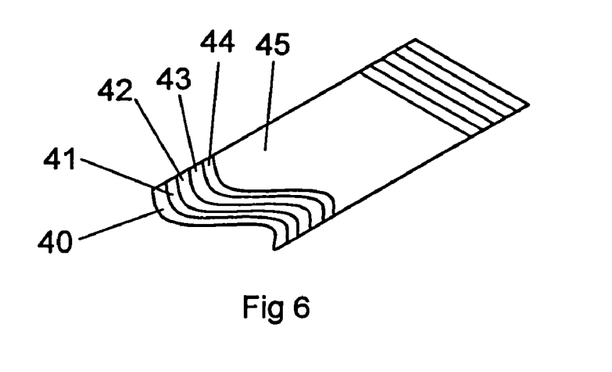
FIG. 6 illustrates tether laminations of strength contributing members.

The tethers experience differing stresses along their lengths and thus are crated with a taper by means of different numbers of laminations of differing capacity strength members as depicted by 40, 41, 42, 43, 44 and 45 in FIG. 6.

Figure 7:
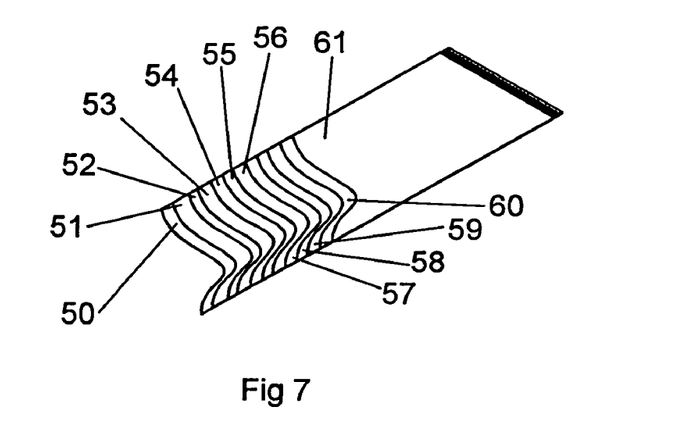
FIG. 7 illustrates tether laminations of counterweight mass contributing members.
Figure 8:
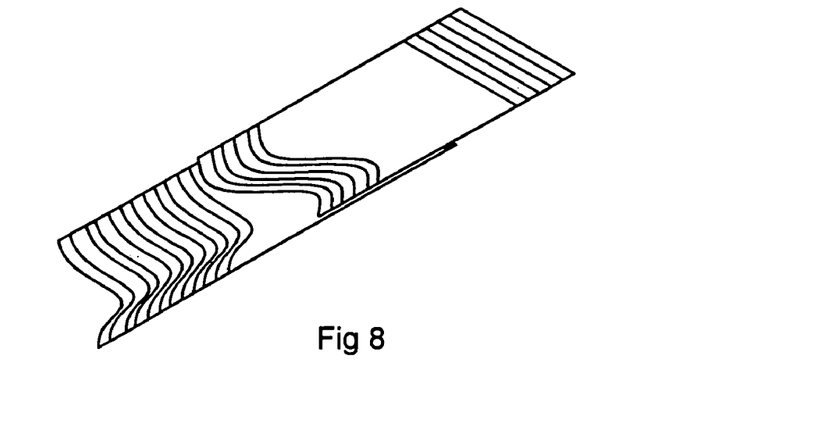
FIG. 8 illustrates tether laminations constructed from FIG. 6 and FIG. 7 laminates.

Laminated onto the transport tether 2 and at locations indicated by finely drawn circles 10, 11, 12, 13, 14, 15, 16, 17 and 18 on the lower catenary and 20, 21, 22, 23, 24, 25, 26 and 27 on the upper catenary are mass contributing members such as steel foil and as depicted in FIG. 7 and FIG. 8. The locations of the finely drawn circles represents the positions of the laminations and the relative areas of the finely drawn circles represents the relative additional mass added to the transport tether 2. In the configuration and position shown in FIG. 1, FIG. 2, FIG. 3, FIG. 4 and FIG. 5 the mass contributing members located at the finely drawn circles 10, 11, 12, 13, 14, 15, 16, 17 and 18 are influenced more by gravitational force than by centripetal force and thereby exert a positive weight. In the configuration and position shown in FIG. 1, FIG. 2, FIG. 3, FIG. 4 and FIG. 5 the mass contributing members located at the finely drawn circles 20, 21, 22, 23, 24, 25, 26 and 27 are influenced more by centripetal force than by gravitational force and thereby exert a positive weight.

At the position of the transport tether 2 depicted in FIG. 1, FIG. 2, FIG. 3 and FIG. 4 the weight of 10, 11, 12, 13, 14, 15, 16, 17 and 18 is transferred towards attachment point 4 as opposed to towards the elevator 9 and therefore does not contribute to the net weight of the movable portion of the transport tether. At the position of the transport tether 2 depicted in FIG. 5 the weight of 10, 11, 12, 13, 14, 15, 16, 17 and 18 is transferred towards the elevator 9 as opposed to towards attachment point 4 and therefore does contribute to the net weight of the movable portion of the transport tether.

At the position of the transport tether 2 depicted in FIG. 1, FIG. 2, FIG. 3 and FIG. 5 the majority weight of 20, 21, 22, 23, 24, 25, 26 and 27 is transferred towards attachment point 5 as opposed to towards the elevator 9. At the position of the transport tether 2 depicted in FIG. 4 the majority weight of 20, 21, 22, 23, 24, 25, 26 and 27 is transferred towards the elevator 9 as opposed to towards attachment point 5.

The placement of the mass contributing members and the amount of mass placed thereon are such that the transport tether 1 with elevator 9 and payload (not shown) achieve neutral buoyancy when at the position as depicted in FIG. 1, FIG. 2 and FIG. 3. As the movable portion of the transport tether together with elevator 9 is lowered the positions on the transport tether 1 of the apex of the upper and lower catenaries also move. And as the position of the upper apex moves the mass at locations 20, 21, 22, 23, 24, 25, 26 and 27 successively, in that order, transition from the side of the apex containing attachment point 5 to the side of the apex containing the elevator 9. As these mass elements transition from one side of the apex to the other side of the apex their respective negative weights are relieved from transfer to attachment point 5 and instead, the respective negative weights are transferred to elevator 9.

As the movable portion of the transport tether 1 is lowered from the neutral buoyancy position of FIG. 1 to position in FIG. 4 the movable portion of the transport tether 1 together with the elevator and payload 9 approaches the body 7 and therefor the influence of gravity on the movable portion of the transport tether 1 increases as the influence of centripetal force on the movable portion of the transport tether 1 together with the elevator and payload 9 decreases. This means that the upper catenary counterweight mass has to increase as the movable portion of the transport tether 1 is lowered. This is accomplished by the mass contributing members 20, 21, 22, 23, 24, 25, 26 and 27 when the apex of the upper catenary successively transfers across them in sequence 20, 21, 22, 23, 24, 25, 26 and 27. And thereby the influence of their respective negative weights is transferred from attachment point 5 to elevator 9. It should be noted that the mass of the mass contributing members 20, 21, 22, 23, 24, 25, 26 and 27 increase as indicated by the proportion of the area of their respective finely drawn circles.

As the movable portion of the transport tether 1 together with the elevator and payload 9 is raised from the neutral buoyancy position of FIG. 1 to position in FIG. 5 the elevator 9 approaches the locomotion device 31 and therefor the influence of gravity on the movable portion of the transport tether and elevator decreases as the influence of centripetal force increases. This means that the lower catenary counterweight mass has to increase as the movable portion of the transport tether 1 is raised. This is accomplished by the mass contributing members 10, 11, 12, 13, 14, 15, 16, 17 and 18 when the apex of the lower catenary successively transfers across them in sequence 10, 11, 12, 13, 14, 15, 16, 17 and 18. And thereby the influence of their respective positive weights is transferred from attachment point 4 to elevator 9. It should be noted that the mass of the mass contributing members 10, 11, 12, 13, 14, 15, 16, 17 and 18 vary as indicated by the proportion or the areas of their respective finely drawn circles.

In FIG. 1, FIG. 2, FIG. 3 FIG. 4 and FIG. 5 the transport tether 1 passes through a locomotion device 31 that is capable of exerting a pull force on the transport tether 1 either downwards towards the rotating non-luminous celestial body 7 or upwards away from the rotating non-luminous celestial body 7. The locomotion device is attached to a truss 30 that restricts the vertical motion of the locomotion device 31 when it exerts a pull force on the transport tether 1. The truss 30 and locomotion device 31 are positioned at or just above the upper service altitude of the elevator 9. In the case of this being geosynchronous orbit altitude on Earth this would be approximately 36,000 kilometers. In FIG. 1, FIG. 4 and FIG. 5 one end of the truss 30 is attached to the primary support tether 2 and the other end of the truss is attached to the anchored portion of the transport tether 1 on the side of the transport tether 1 nearest the attachment point 5. In FIG. 2 one end of the truss 30 is attached to the primary support tether 2 and the other end of the truss is attached to the secondary support tether 3. In FIG. 3 one end of the truss 30 is attached to the primary support tether 2 and the other end of the truss is attached back to the primary support tether 2 by means of tethers 34 and 35, the tension on tether 2 restricts the vertical motion of the locomotion device 31.

In FIG. 1, FIG. 2, FIG. 3, FIG. 4 and FIG. 5 and in the case of the truss 30 being located at geosynchronous orbit altitude on Earth the approximate length of the truss 30 is on the order of 1 to a few kilometers and the length of the truss 30 is oriented along the North/South direction. The purpose of this is as the movable portion of the transport tether raises above or lowers beneath an at-rest altitude it will experience a Coriolis force along the East/West direction. The separation of 4 and 5 in the North/South direction permit the catenaries to swing past the other tether(s) in their proximity.

FIG. 6 depicts laminations of strength contributing members 40, 41, 42, 43, 44 and 45 which may be of different thickness and/or number.

FIG. 7 depicts laminations of counterweight mass contributing members 50, 51, 52, 53, 54, 55, 56, 57, 58, 59, 60 and 61 which may be of different thickness and/or number.

FIG. 8 depicts a lamination of the FIG. 6 and FIG. 7 laminates which may be of different thickness and/or number and who's locations are indicated by the finely drawn circles 10, 11, 12, 13, 14, 15, 16, 17 and 18 of the lower catenary and 20, 21, 22, 23, 24, 25, 26 and 27 of the upper catenary.

Should the locomotion device use linear induction motor technology for imparting the pull up and pull down forces then laminated onto the transport cable 1 between elevator 9 and the locomotion device 31 and which lamination continues above locomotion device 31 for a distance equal to that between elevator 9 and locomotion device 31 is a layer or layers on non-magnetic conducting material such as aluminum. The laminations of which can be depicted by FIG. 7 and FIG. 8 when substituting aluminum for steel (or other suitable counterweight mass contributing material). See U.S. Pat. No. 6,483,208 Nov. 19, 2002 Hooley "Linear Motor", which is hereby incorporated by reference.

What is claimed is:

1. A flexible tension structure apparatus formed into a double catenary shape, said structure located above the approximate equator of a rotating non-luminous celestial body, with one catenary below geosynchronous orbit altitude and the other catenary above geosynchronous orbit altitude, and with a section of the flexible tension structure between the catenaries serving as the carriage of a vertical transport device.

2. The apparatus described in claim 1 with one end of the flexible tension structure attached to the tether of a equatorially, or near equatorially, tethered satellite structure and the other end of the flexible tension structure attached substantivally at the surface of the rotating non-luminous celestial body.

3. The apparatus described in claim 1 with one end of the flexible tension structure attached to the tether of a equatorially, or near equatorially, tethered satellite structure and the other end of the flexible tension structure attached to a second anchored tethered satellite structure.

4. The apparatus described in claim 1 with both ends of the flexible tension structure attached to the tether of a equatorially, or near equatorially, tethered satellite structure.

5. The apparatus of claim 1 further including a locomotion device in operative relationship with and capable of exerting a pull force on the carriage section of the flexible tension structure.

6. The apparatus of claim 1 further including the application of counterweight mass to the flexible tension structure with the purpose of facilitating the use of the apparatus as a vertical transport device.

7. The apparatus of claim 6 further including the application of counterweight mass in a manner that maintains balance of said vertical transport device for a given payload carried by the vertical transport device during the complete traversal of the vertical transport device.

8. The apparatus of claim 6 further including the application of counterweight mass in a manner that maintains balance of said vertical transport device for a given payload carried by the vertical transport device only at one or more designated positions on the traversal of the vertical transport device, whereby when the vertical transport device is in positions other than the aforementioned designated balance positions the counterweight mass distribution is made to cause the vertical transport device to experience an apparent attraction towards one or more of the aforementioned designated balance positions.

* * * * *